Patented Feb. 13, 1951

2,541,167

UNITED STATES PATENT OFFICE 2,541,167

VINYLIDENE CHLORIDE INTERPOLYMER AS A COATING FOR REGENERATED CELLULOSE FILM

Gilbert Pitzl, Eggertsville, N. Y., assignor to E. I. du Pont de Nemours & Company, Wilmington, Del., a corporation of Delaware No Drawing. Application June 25, 1948, Serial No. 35,295

4 Claims. (Cl. 260—17.4)

This invention relates to the manufacture of moistureproof, heat-sealable, flexible transparent film, and more particularly to the production of a film comprising regenerated cellulose film coated with a moistureproof, heat-sealable, flexible transparent coating of organic polymeric material, which coating tightly adheres to the base film even under high moisture conditions.

The coating of flexible, transparent, regenerated cellulose film and the like with vinyl polymers and copolymers for the purpose of rendering the film moisture-resistant, heat sealable and otherwise improving the properties thereof is well known. Because they are tough, flexible, strong, odorless, transparent, heat sealable and inherently moisture-resistant, thin coatings of vinylidene chloride/acrylonitrile copolymers particularly recommend themselves for this purpose. Coatings of vinylidene chloride/acrylonitrile copolymers comprising at least 80% vinylidene chloride have excellent moistureproofness but their adhesion to the base film under high moisture conditions such as are encountered when the coated film is wrapped around products containing considerable water (cheese, fish, fresh vegetables, etc.), is very poor. In order to improve the adhesion, it is currently necessary to first apply an anchoring sub-coating and then the vinylidene chloride/acrylonitrile coating, which represents an extra processing step, and hence a commercial handicap.

An object of this invention therefore is to improve the adherence or anchorage to the base film of transparent, moistureproof heat-sealable coatings of vinylidene chloride copolymer.

Another object is to provide a regenerated cellulose film having in direct contact therewith a well adhered moistureproof, heat-sealable, transparent coating of vinylidene chloride copolymer.

Still another object is to provide moistureproof, heat-sealable transparent coatings of vinylidene chloride copolymer which copolymers strongly adhere directly to base materials, such as regenerated cellulose film, even when the coated base material is maintained in an atmosphere of high moisture content, or in direct contact with water for considerable periods of time. These and other objects will more clearly appear hereinafter.

After extensive research I have found that the three-component, hydroxyl-containing copolymers formed by interpolymerizing a critically proportioned mixture of vinylidene chloride, acrylonitrile, and 2-hydroxyl ethylacrylate monomers, or by copolymerizing a monomer mixture of vinylidene chloride, acrylonitrile, and vinyl acetate and thereafter hydrolyzing or saponifying the acetate groups, constitute excellent moistureproofing, heat-sealable transparent coatings for regenerated cellulose, and are outstanding in their ability to bond directly and strongly to regenerated cellulose film, which bond is highly resistant to the deteriorating influence of high moisture or water.

Accordingly the above objects are achieved by coating a base film or sheet of regenerated cellulose, by any convenient coating technique, with a coating composition comprising essentially a copolymer of vinylidene chloride, acrylonitrile and 2-hydroxy ethylacrylate, or hydrolyzed vinyl acetate.

In order to secure self-anchoring copolymers (i. e. copolymers capable of strongly adhering directly to regenerated cellulose) having the requisite degree of moistureproofness, heat-sealability, flexibility, etc., it is essential that the initial relative proportions of monomers in the reaction mixture be within the following ranges: The 2-hydroxy ethylacrylate, or vinyl acetate content of the reaction mixture may be varied from 1% to 15%; below 1% the anchorage of the resulting copolymer, under high moisture conditions, is unsatisfactory, and copolymers resulting from a reaction mixture containing in excess of 15% 2-hydroxy ethylacrylate or vinyl acetate are not moistureproof. Acrylonitrile should constitute from 5 to 15% of the monomer charge. Less than 5% of acrylonitrile results in insolubility, and more than 15% imparts inferior moistureproofness. The vinylidene chloride of course constitutes the remaining 70% to 94% of the monomer charge.

The monomers may be copolymerized by any known method to form the three component interpolymers of this invention. For example, the interpolymerization may be conducted in aqueous emulsions containing a catalyst and activator, e. g., ammonium persulfate and meta sodium bisulfite, and any of the well known emulsifying and/or dispersing agents. Alternatively, the copolymers of this invention may be prepared by polymerization of the monomeric components in bulk without added diluent, or the monomers may be reacted in appropriate organic solvent reaction media. The total catalyst-activator concentration should generally be kept within a range of about 0.01% to about 2.0% by weight of the monomer charge, and preferably within a range of concentration of 0.1% to 1.0%. Improved solubility and viscosity values are obtained by conducting the polymerization in the presence of mercaptans such as ethyl mercaptan, lauryl mercaptan, tertiary dodecyl mercaptan, etc., which are effective in reducing cross-linking in the copolymer. In general, the mercaptans should be used in concentrations of 0.1% to 5.0% by weight, based on the weight of polymerizable monomers present in the charge.

When the copolymer is prepared from vinyl acetate (together with vinylidene chloride and acrylonitrile) it is necessary to subject the copolymer to a hydrolysis reaction to convert the acetate groups to the desired hydroxyl groups. While any known method for converting polyvinyl acetate to polyvinyl alcohol may be employed, a convenient procedure is to saponify the interpolymer, using a mineral acid, such as sulfuric acid as the hydrolyzing agent (U. S. 2,399,653).

Application of these novel copolymers to the base film may be made either from an organic solvent solution or from an aqueous dispersion of the copolymers, and by any convenient coating expedient such as dipping, roll-coating, brushing, spraying, etc., followed, where necessary, by a solvent-removal or drying step.

The following examples of preferred embodiments further illustrate the principles and practice of this invention. Parts and percentages are by weight unless otherwise indicated.

EXAMPLE I

A charge consisting of:

| | Parts |
|---|---|
| Water | 2300 |
| Ammonium persulfate | 9.6 |
| Sulfated methyl oleate | 45 |
| Acrylonitrile | 60 |
| Vinyl acetate | 60 |
| Vinylidene chloride | 480 | is heated to 33° C. under reflux and stirring and 4.8 parts of meta sodium bisulfate in 25 parts of water is added. A reaction temperature of 32–35° C. is maintained for 16 hours after which time the emulsion is drawn off, coagulated with aluminum sulfate and the polymer purified. These conditions produce an approximate 82/8/10 vinylidene chloride/acrylonitrile/vinyl acetate copolymer in yields of 80% which interpolymer is soluble in dioxane.

50 parts of the above dried polymer is dissolved in 400 parts of dioxane at 50° C. Then, under reflux and stirring, 160 parts of methanol adjusted to a pH of 2 with $H_2SO_4$ is slowly added. After addition is completed, the mixture is heated to 70° C. and allowed to react under reflux for 8 hours. The polymer is coagulated with water and purified. The saponification of vinyl ester copolymers using a mineral acid, such as sulfuric acid, as a hydrolyzing agent is old in the art. (See U. S. 2,399,653 or French 724,910).

EXAMPLE II

A charge consisting of:

| | Parts |
|---|---|
| Water | 2300 |
| Ammonium persulfate | 9.6 |
| Sulfated methyl oleate | 45 |
| Acrylonitrile | 60 |
| 2-hydroxyl ethylacrylate | 60 |
| Vinylidene chloride | 480 | is heated to 33° C. under reflux and stirring and 0.64 parts of meta sodium bisulfite in 25 parts of water is added. A reaction temperature of 32–35° C. is maintained for 5–6 hours, after which time the emulsion is drawn off, coagulated with aluminum sulfate and the polymer purified. These conditions produce an approximate 80/10/10 vinylidene chloride/acrylonitrile/2 - hydroxyl ethylacrylate copolymer, which copolymer is soluble in a 50/50 methyl ethyl ketone/toluene mixture.

The results of evaluation of these two copolymers as coatings on regenerated cellulose film 1 mil thick appear in Table I.

Table I

| Polymer | Solubility | Heat Seals—35% RH | | Anchorage in $H_2O$—25° C. (3) |
|---|---|---|---|---|
| | | Initial (1) | Peel (2) | |
| Hydrolyzed product of Example I | Sol. in 1,3-dioxane | 450 | 350 | OK—1 day; stripped—2 days. |
| Polymer of Example II | Sol. in mixture of methyl ethyl ketone and toluene. | 185 | 98 | Fair. |
| Control—90/10 Vinylidene chloride/acrylonitrile. | Sol. in methyl ethyl ketone. | 34 | 13 | Very Poor. |

The above data show significant improvement in adhesion for the hydroxyl-containing interpolymers as compared to the control.

(1) The definition of and tests for determining heat seal bond strength are set forth in U. S. 2,236,546 (Mitchell).

(2) Whereas the initial heat seal value is the force in grams required to just rupture the seal, the peel heat seal value is the force required to separate the seal after it has been ruptured. It of course, takes more strength to rupture the heat seal initially than it does to separate the seal after it has once been ruptured.

(3) Anchorage—refers to the adhesion of the coating to the base sheet when in direct contact with water. It is more fully defined in U. S. 2,301,959 (Lanning).

While the invention contemplates the use of the novel copolymers herein as the essential film-former constituent of the coating or coating composition, it is to be understood that in many instances it will be desirable to incorporate in the coating or coating composition other effect materials such as slip agents, pigments, dyes, plasticizers, delustrants etc., and the addition of such materials is therefore understood to be within the purview of this invention.

The novel vinylidene chloride coatings of this invention, as shown hereinabove, strongly adhere directly to regenerated cellulose base film under substantially all conditions encountered in the use of transparent wrapping tissues, and thus enable the obtainment of vinylidene chloride copolymer-coated regenerated cellulose film without the necessity of applying to the base film a costly anchoring subcoat. Moreover coated films of this invention have superior heat-seal characteristics which of course enhance their value in the art of transparent wrapping tissue.

As many widely different embodiments can be made without departing from the spirit and scope of my invention, it is understood that said invention is not limited in any way except as defined in the appended claims.

I claim:

1. A moistureproof, heat-sealable wrapping tissue comprising regenerated cellulose film having a self-anchored coating comprising essentially a copolymer obtained by polymerizing a mixture of 1–15% of vinyl acetate, 5–15% of acrylonitrile, and 70–94% of vinylidene chloride, the proportions being selected to total 100%, and thereafter hydrolyzing to convert the acetate groups of the resulting copolymer to hydroxy groups.

2. The product of claim 1 wherein the polymerizable monomer mixture consists of 10% vinyl acetate, 10% acrylonitrile, and 80% vinylidene chloride.

3. A copolymer obtained by polymerizing a mixture of 1–15% of vinyl acetate, 5–15% of acrylonitrile, and 70–94% of vinylidene chloride, and thereafter hydrolyzing to convert the acetate groups of the resulting copolymer to hydroxy groups.

4. A copolymer obtained by hydrolyzing a copolymer consisting of 82% vinylidene chloride, 8% acrylonitrile and 10% vinyl acetate.

GILBERT PITZL.

No references cited.